United States Patent
Kaneko et al.

(10) Patent No.: US 10,622,674 B2
(45) Date of Patent: Apr. 14, 2020

(54) POLYMER GEL ELECTROLYTE, LITHIUM ION BATTERY AND METHOD FOR PRODUCING SAME

(71) Applicant: NEC ENERGY DEVICES, LTD., Sagamihara-shi, Kanagawa (JP)

(72) Inventors: Shinako Kaneko, Kanagawa (JP); Yasutaka Kono, Kanagawa (JP); Takayuki Suzuki, Kanagawa (JP)

(73) Assignee: Envision AESC Energy Devices Ltd., Sagamihara-shi (JP)

( * ) Notice: Subject to any disclaimer, the term of this patent is extended or adjusted under 35 U.S.C. 154(b) by 90 days.

(21) Appl. No.: 15/661,626

(22) Filed: Jul. 27, 2017

(65) Prior Publication Data

US 2017/0324115 A1    Nov. 9, 2017

Related U.S. Application Data

(62) Division of application No. 14/423,753, filed as application No. PCT/JP2013/073638 on Sep. 3, 2013, now Pat. No. 9,793,575.

(30) Foreign Application Priority Data

Sep. 10, 2012 (JP) .................. 2012-198566

(51) Int. Cl.
| | | |
|---|---|---|
| *H01M 10/0565* | (2010.01) | |
| *H01M 10/0525* | (2010.01) | |
| *H01M 10/052* | (2010.01) | |
| *H01M 10/058* | (2010.01) | |
| *H01M 6/16* | (2006.01) | |
| *H01M 6/18* | (2006.01) | |
| *H01B 1/12* | (2006.01) | |

(52) U.S. Cl.
CPC ........ *H01M 10/0565* (2013.01); *H01B 1/122* (2013.01); *H01M 6/164* (2013.01); *H01M 6/181* (2013.01); *H01M 10/052* (2013.01); *H01M 10/058* (2013.01); *H01M 10/0525* (2013.01); *Y10T 29/49115* (2015.01)

(58) Field of Classification Search
CPC ........ H01M 10/0565; H01M 10/0525; H01M 6/164; H01M 6/181; H01M 10/052; H01M 10/058; H01B 1/122; Y10T 29/49115

See application file for complete search history.

(56) References Cited

U.S. PATENT DOCUMENTS

| | | | | |
|---|---|---|---|---|
| 5,825,549 A | * | 10/1998 | Kawamata | ........... G02B 1/10 359/582 |
| 2004/0197662 A1 | | 10/2004 | Maruyama et al. | |
| 2012/0321962 A1 | * | 12/2012 | Kajita | ........... H01M 4/134 429/300 |
| 2013/0330615 A1 | * | 12/2013 | Morita | ........... H01M 4/131 429/211 |
| 2014/0127577 A1 | * | 5/2014 | Fleischmann | ........ H01M 4/139 429/215 |

FOREIGN PATENT DOCUMENTS

| | | |
|---|---|---|
| JP | 2001-229966 A | 8/2001 |
| JP | 2001-338690 A | 12/2001 |
| JP | 2002-216848 A | 8/2002 |
| JP | 2008-071624 A | 3/2008 |
| JP | 2008-287932 A | 11/2008 |
| JP | 2009-070605 A | 4/2009 |
| JP | 2011-519116 A | 6/2011 |
| JP | 4822726 B2 | 11/2011 |
| WO | 2011/102453 A1 | 8/2011 |

OTHER PUBLICATIONS

International Search Report for PCT/JP2013/073638 dated Nov. 12, 2013.

* cited by examiner

*Primary Examiner* — Muhammad S Siddiquee
(74) *Attorney, Agent, or Firm* — Sughrue Mion, PLLC

(57) ABSTRACT

A polymer gel electrolyte containing at least a lithium salt and an aprotic solvent, in which an amorphous polymer layer is formed on the surface of an electrode active material.

10 Claims, 7 Drawing Sheets

POLYMER GEL ELECTROLYTE, LITHIUM ION BATTERY AND METHOD FOR PRODUCING SAME

CROSS REFERENCE TO RELATED APPLICATIONS

This application is a Divisional of U.S. application Ser. No. 14/423,753 filed Feb. 25, 2015 which claims priority from International Application No. PCT/JP2013/073638 filed Sep. 3, 2013, which claims priority from Japanese Application No. 2012-198566 filed Sep. 10, 2012, the contents of all of which are incorporated herein by reference in their entirety.

TECHNICAL FIELD

The present invention relates to a polymer gel electrolyte, a lithium ion battery using the polymer gel electrolyte and a method for producing the lithium ion battery.

BACKGROUND ART

Lithium ion batteries, since they can realize high energy density, are widely used as power sources of small electronic equipment such as mobile phones and notebook computers, and lately, they have attracted attention also as power sources for large power storage and automobiles.

As a lithium ion battery is increased in size, its energy density tremendously increases. Accordingly, the lithium ion battery is required to have further higher safety. Particularly, in e.g., power sources for large power storage and automobiles, high safety is required. For the reason, safety measures are taken by structural design of a cell and a package, a protective circuit, an electrode material, additives serving for preventing overcharge, and enhancement of a shutdown function of a separator, to ensure safety of a secondary battery.

In a lithium ion battery, an aprotic solvent such as a cyclic carbonate and a linear carbonate is used as the electrolyte solvent. Such an aprotic solvent has a high dielectric constant and a high lithium-ion conductivity; however it tends to have a low flash point.

As one of the means for further improving safety of a lithium ion battery, an attempt has been made to decrease flowability of the electrolytic solution. More specifically, a polymer gel electrolyte, in which an electrolytic solution is held between bridge molecules of crosslinked polymer, and an inorganic gel electrolyte, in which an electrolytic solution is held by an inorganic gelatinizing material such as silica gel, have been investigated.

Polymer gel electrolytes using a crosslinked polymer include those called physical gel and those called chemical gel. In the case of the physical gel, the physical gel is formed by disposing a polymer sheet between a positive electrode and a negative electrode and injecting an electrolytic solution to swell the polymer sheet. In this manner, flowability of the electrolytic solution is suppressed. In the case of the chemical gel, the gel is formed by injecting a crosslinkable polymer precursor and a polymerization initiator together with an electrolytic solution between electrodes and conducting a crosslinking reaction to hold the electrolytic solution between the bridge molecules within the gel. In this manner, flowability of the electrolytic solution is suppressed.

In the meantime, a technique of using a substance, which produces a protective film called an SEI (Solid Electrolyte Interface) on a surface of an electrode, as an additive, is known. This additive is reductively decomposed at a higher potential than a carbonate used as an electrolyte solvent to form an SEI. The SEI has a high lithium ion permeability and a large effect on the charge-discharge efficiency, cycle characteristics and safety of a battery. In addition, SEI can reduce the irreversible capacity of a carbon material and an oxide material of electrodes.

Patent Literature 1 describes production of gel electrolyte battery, in which a gel electrolyte (chemical gel) is produced by polymerizing a polypropylene glycol di(meth)acrylate compound by heating with a peroxide used as a polymerization initiator.

Patent Literature 2 describes production of a lithium polymer battery, in which a solid electrolyte (chemical gel) is formed by crosslinking a crosslinkable material having a ring-opening polymerization functional group through cationic polymerization in a battery container.

Patent Literature 3 describes production of a lithium ion secondary battery, in which an electrolytic solution is gelatinized (to form a chemical gel) by crosslinking a polymer containing a cation polymerizable monomer unit through cationic polymerization in a battery container.

Patent Literature 4 describes production of an electrochemical cell, in which a gel electrolyte is formed by cationic polymerization of a polymer having a cationic polymerizable functional group by charge and discharge, and describes that a SEI is formed at this time.

Patent Literature 5 describes a gelatinous electrolyte battery having a gelatinous electrolyte formed of a matrix polymer (vinylidene fluoride-hexafluoropropylene copolymer), which is swollen with an electrolytic salt-containing nonaqueous electrolyte.

Patent Literature 6 describes a lithium battery using a gelatinous electrolyte formed of an electrolyte, a non-aqueous organic solvent and a hydrophobic inorganic oxide fine particle (silica or titania).

CITATION LIST

Patent Literature

Patent Literature 1: JP2001-338690A
Patent Literature 2: JP2009-70605A
Patent Literature 3: JP4822726B
Patent Literature 4: JP2011-519116A
Patent Literature 5: JP2002-216848A
Patent Literature 6: JP2001-229966A

SUMMARY OF INVENTION

Technical Problem

In the techniques for forming a chemical gel as described in Patent Literatures 1 to 4, a crosslinked polymer layer is present on a surface of an electrode when an SEI is formed. In the technique of Patent Literature 1, a reaction residue of a peroxide and an unreacted substance thereof remain. If the polymer layer is present on an electrode surface, resistance at the interface of an electrode active material increases and a non-uniform SEI is formed on the electrode surface. If the SEI is non-uniform, an electrolytic solution component, i.e., a carbonate, is easily decomposed on the electrode surface (for example, an electrode active material surface or a conductive auxiliary surface). As a result, problems such as increase of gas yield and resistance and deterioration of cycle characteristics and rate characteristics occur. Also, if a reaction residue of a peroxide and an unreacted substance thereof remain, problems such as decrease of charge-discharge efficiency, increase of gas yield and deterioration of cycle characteristics occur.

In Patent Literature 4, it is described that an SEI is formed in forming a gel electrolyte and accelerates the reaction (crosslinking reaction) of a polymerizable functional group of a polymer in a charge/discharge step. However, since an SEI is formed in forming a polymer gel electrolyte, the SEI is not uniformly formed. As a result, problems such as increase in gas yield and resistance and deterioration of cycle characteristics and rate characteristics occurred. This literature is silent about crystallization of a polymer of the polymer gel electrolyte formed.

Also in the techniques using a physical gel as described in Patent Literatures 5 and 6, since a polymer layer is present on a surface of an electrode when an SEI is formed, the SEI is not uniformly formed. As a result, problems such as increase of gas yield and resistance and deterioration of cycle characteristics and rate characteristics occurred. Since a typical physical gel, i.e., polyvinylidene fluoride (PVDF), is known as a crystalline polymer, a lithium ion battery using a physical gel containing PVDF as a main agent had a problem in that satisfactory rate characteristics cannot be obtained.

As a result of investigation by the present inventors, it was found that if a high crystallinity polymer is present on an electrode active material surface, rate characteristics deteriorate; and that if a high crystallinity polymer is formed on an electrode active material surface before an SEI is formed, the following formation of the SEI cannot be made uniformly, with the result that cycle characteristics also deteriorate. Based on the investigation results, intensive studies were further conducted, and as a result, the present invention was accomplished.

Accordingly, an object of the present invention is to provide a lithium ion battery using a polymer gel electrolyte and having satisfactory rate characteristics or satisfactory rate characteristics and cycle characteristics, and provide a method for producing the lithium ion battery as well as the polymer gel electrolyte.

Solution to Problem

According to an aspect of the present invention, there is provided a polymer gel electrolyte comprising at least a lithium salt and an aprotic solvent, wherein an amorphous polymer layer is formed on a surface of an electrode active material.

According to another aspect of the present invention, there is provided a lithium ion battery comprising a positive electrode, a negative electrode, a separator and the polymer gel electrolyte.

According to another aspect of the present invention, there is provided a method for producing a lithium ion battery, comprising:

a step (A) of housing an electrode group comprising a positive electrode, a negative electrode and a separator in an outer package;

a step (B) of injecting a pre-gel solution, which is a precursor of a polymer gel electrolyte, within the outer package, to impregnate the electrode group with the pre-gel solution to form a pre-battery;

a step (C) of charging the pre-battery while keeping the state of the pre-gel solution; and a step (E) of gelatinizing the pre-gel solution by maintaining the pre-battery under warm temperature while charging to form the polymer gel electrolyte.

Advantageous Effects of Invention

According to an exemplary embodiment, it is possible to provide a lithium ion battery using a polymer gel electrolyte and having satisfactory rate characteristics or satisfactory rate characteristics and cycle characteristics, and a method for producing the lithium ion battery. According to another exemplary embodiment, it is possible to provide a polymer gel electrolyte suitable for such a lithium ion battery.

BRIEF DESCRIPTION OF DRAWINGS

FIG. 1A is a plan view of the positive electrode and FIG. 1B is a lateral view of the positive electrode.

FIG. 2A is a plan view of the negative electrode and FIG. 2B is a lateral view of the negative electrode.

DESCRIPTION OF EMBODIMENTS

Figure 1A:
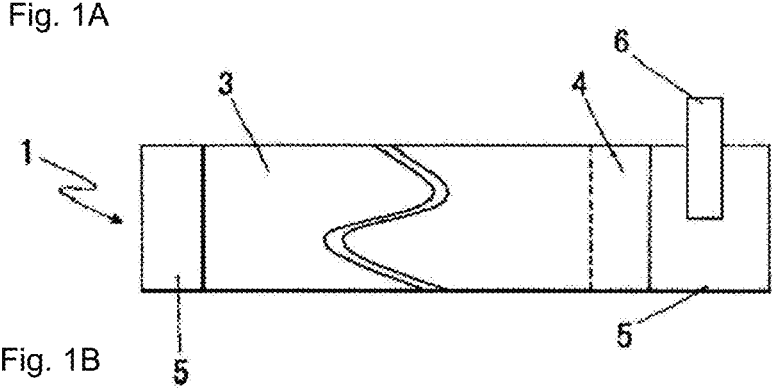
FIGS. 1A and 1B show views for illustrating the structure of the positive electrode of the lithium ion secondary battery in Example 1.

As a result of studies, it was found that, in a lithium ion battery using a polymer gel electrolyte containing at least a lithium salt and an aprotic solvent, satisfactory rate characteristics can be obtained by forming an amorphous polymer layer on an active material surface of a positive electrode and/or a negative electrode. Based on the finding, the present invention was attained.

As a result of studies, it was further found that satisfactory rate characteristics and cycle characteristics can be obtained by forming an SEI from an electrolyte solvent or an SEI-forming agent in the beginning of charging a battery and further forming a polymer gel electrolyte after the battery was charged. Based on the finding, the present invention was attained. Furthermore, by performing a re-impregnation treatment, a pre-gel solution can be homogenized and the remaining SEI-forming agent in the pre-gel solution can be homogenized, with the result that a stable SEI can be formed for a long time and cycle characteristic can be improved. Furthermore, owing to the re-impregnation treatment, micro pores are further sufficiently impregnated with the pre-gel solution, with the result that a uniform SEI up to the interior portion of the micro pores can be formed.

The amorphous polymer layer to be formed on a surface of an electrode active material is preferably a polymer layer derived from a polymer gel electrolyte. The amorphous polymer layer can be formed on a surface of the electrode active material simultaneously with formation of the polymer gel electrolyte in a production method according to the exemplary embodiment, since a pre-crosslinked polymer for forming the polymer gel electrolyte serves as a raw material component.

In the production method according to the exemplary embodiment, the reason why an amorphous polymer is formed on the surface of an electrode active material is not specifically elucidated; however, the following cause is conceivable. First, an SEI is formed on a surface of an electrode that is charged, and thereafter, a polymer gel electrolyte is formed on a surface of an electrode active material. In this case, since the state of ions present in the electrolytic solution and the conditions such as charges of the surface of the electrode active material and chemical compositions, change from those before charging, satisfactory affinity of the electrode active material surface for a pre-crosslinked polymer is obtained. Furthermore, since the polymer gel electrolyte is formed on the electrode active material surface, steric hindrance of polymer molecule chains effectively works. For these reasons, a thin film amorphous polymer layer is preferentially formed on the electrode active material surface. Consequently, it is presumed that a uniform amorphous polymer layer is formed.

Now, the exemplary embodiment of the present invention will be more specifically described, below.

A polymer gel electrolyte according to the exemplary embodiment contains at least a lithium salt and an aprotic solvent, and an amorphous polymer layer is formed on a surface of an electrode (positive electrode or/and negative electrode) active material.

In the polymer gel electrolyte, it is preferable that the thickness of the amorphous polymer layer falls within the range of 3 to 30 nm. The amorphous polymer layer is preferably formed derived from the polymer gel electrolyte. The polymer gel electrolyte is preferably formed from a polymer having a cationic polymerizable functional group.

Furthermore, in the polymer gel electrolyte, a film component derived from an electrode surface coating film-forming agent (SEI-forming agent) or a film component derived from an electrolyte solvent (solvent of a pre-gel solution) is preferably contained between the electrode active material surface and the amorphous polymer layer. The SEI-forming agent is preferably at least one selected from a cyclic unsaturated sultone compound, a carbonate, a cyclic disulfonate and a linear disulfonate.

A lithium ion battery according to another exemplary embodiment of the present invention contains a positive electrode, a negative electrode, a separator and the aforementioned polymer gel electrolyte.

An amorphous polymer is capable of sufficiently holding a solvent as a gel electrolyte and unlikely to serve as a resistance against ion conduction. In contrast, a crystalline polymer, since it rarely holds a solvent and further traps ions between polymer chains, serves as a resistance against ion conduction. In the exemplary embodiment of the present invention, since an active material surface is uniformly coated with a thin amorphous polymer layer, migration of lithium ions through the interface of the active material is not inhibited. As a result, increase of resistance is suppressed and sufficient rate characteristics can be obtained. Furthermore, a lithium ion battery having satisfactory cycle characteristics for a long time can be provided. The thickness of the amorphous polymer layer formed on the surface of an electrode active material is preferably 3 nm or more and more preferably 5 nm or more in view of uniformity, etc. In view of ion conductivity, etc., the thickness is preferably 30 nm or less, more preferably 20 nm or less and further preferably 15 nm or less. The thickness of the amorphous polymer layer refers to the thickness of a polymer layer formed on the active material of an electrode surface.

In the exemplary embodiment, the type of polymer for forming a polymer gel electrolyte is not particularly limited as long as it can produce an amorphous polymer.

A method for producing a lithium ion battery according to the exemplary embodiment of the present invention includes a step (A) of housing an electrode group containing a positive electrode, a negative electrode and a separator in an outer package, a step (B) of injecting a pre-gel solution, which is a precursor of a polymer gel electrolyte, within the outer package, to impregnate the electrode group with the pre-gel solution to form a pre-battery, a step (C) of charging the pre-battery while keeping the state of the pre-gel solution (so as not to be gelatinized), and a step (E) of gelatinizing the pre-gel solution by maintaining the pre-battery charged under warm temperature to form a polymer gel electrolyte.

The manufacturing method preferably includes, between the step (C) and the step (E), a step (D) of re-impregnating the electrode group with the pre-gel solution within the pre-battery. In the manufacturing method, the polymer gel electrolyte contained in the lithium ion battery to be produced is preferably a polymer gel electrolyte in which an amorphous polymer layer is formed on the surface of the aforementioned electrode active material. The pre-gel solution can contain a lithium salt, an aprotic solvent and a polymer having a polymerizable functional group. The pre-gel solution can further contain an SEI-forming agent. The polymer having a polymerizable functional group is preferably a polymer having a cationic polymerizable functional group.

Generally, it is known that when a battery is charged, e.g., a component of an electrolytic solution or an additive is decomposed on an electrode to form an SEI on a surface of the electrode. In a lithium ion battery using a polymer gel electrolyte, a crosslinked polymer layer present on a surface of an electrode sometimes prevents formation of a uniform SEI. When a polymer gel electrolyte is formed by performing a crosslinking reaction of a polymer, since the crosslinking reaction is performed before the battery is charged, the layer of a crosslinked polymer is already present on the surface of the electrode when an SEI is formed. When a physical gel type of polymer gel electrolyte is used, a crosslinked polymer layer is already present on an electrode surface when an SEI is formed. In these cases, the crosslinked polymer layer present on an electrode surface prevents formation of a uniform SEI.

In contrast, according to the exemplary embodiment, a crosslinked polymer layer is not present on the surface of an electrode when an SEI is formed by the initial charging and therefore a uniform SEI can be formed on the electrode surface.

Furthermore, in the case where a re-impregnation treatment is performed after an SEI is formed, penetration of a pre-gel solution into micro pores is accelerated and the pre-gel solution penetrated and the pre-gel solution present in a space in an outer package are homogenized, with the result that a more uniform SEI can be additionally formed. In short, a more uniform SEI is formed in the following step (E) (preferably during still-standing at SOC of 80% or more and 100% or less for 6 hours or more and 21 days or less) by homogenization of the pre-gel solution by re-impregnation.

Furthermore, in the step (E), a crosslinking reaction (for example, crosslinking of a polymerizable functional group of a polymer by polymerization) of a polymer contained in a pre-gel solution occurs and the pre-gel solution is gelatinized to form a polymer gel electrolyte. As a result, a lithium ion battery improved in resistance and rate characteristics and having a satisfactory cycle characteristics for a long time can be provided while ensuring safety by a polymer gel electrolyte suppressed in flowability.

In the step (E), it is preferable that the pre-battery is maintained at a state of charge (a SOC of 80% or more and 100% or less) for 6 hours or more and 21 days or less. In the step (E), it is preferable that the charge state of the pre-battery is maintained under temperature conditions of 35° C. or more and 60° C. or less.

The SOC used herein refers to the state of charge of a battery represented by the following expression:

SOC (%)=100×residual capacity (Ah)/full charge capacity (Ah).

Impregnation in the step (B) can be performed by a reduced-pressure treatment. The pressure during the reduced-pressure treatment is preferably set at 0.01 kPa (abs) or more and 50 kPa (abs) or less and more preferably 0.01 kPa (abs) or more and 20 kPa (abs) or less in order to sufficiently perform impregnation and in view of treatment efficiency. The time for the reduced-pressure treatment can be set similarly in re-impregnation (described later).

The charging in the step (C) is preferably performed under the conditions where an SEI-forming agent in a pre-gel solution can react and a crosslinking reaction of a polymer hardly proceeds. The viscosity of the pre-gel solution may increase during charging; however, in order to obtain a sufficient treatment effect in the re-impregnation treatment later performed, the ratio of viscosity before and after charging, i.e., the ratio of viscosity after charging relative to viscosity (regarded as 1) before charging, is preferably 2 or less. Furthermore, the viscosity (20° C.) after charging is preferably 60 cP (6 cPa·s) or less.

The charging voltage of the step (C) is preferably 2.5 V or more and 4.2 V or less in order to form a sufficient SEI and in view of charging efficiency.

The temperature during charging in the step (C) can be set to fall within the range of e.g., 5° C. to 40° C., preferably 10° C. to 30° C. and more preferably 15° C. to 25° C., in order to suppress a crosslinking reaction and in view of energy cost.

The SOC after charging in the step (C) preferably falls within the range of 80 to 100%

The time from injection of a pre-gel solution in the step (B) to completion of the step (C) is preferably within 10 days in the temperature conditions within the range of 30° C. or less (for example, the range of 5 to 30° C.) and preferably within 6 days in the temperature conditions within the range more than 30° C. to 45° C. or less.

The step (D) may include a re-impregnation step by reducing the pressure within the pre-battery (reduced-pressure treatment). The step (D) may include a re-impregnation step by bringing an ultrasonic vibrator into contact with the pre-battery (ultrasonic vibration treatment). The step (D) may include a re-impregnation step by pressurizing the pre-gel battery (pressure application/release treatment or continuous mobile pressure application treatment).

The re-impregnation of the step (D) can be performed by a reduced-pressure treatment of reducing the pressure in the pre-battery.

The pressure in the reduced-pressure treatment for re-impregnation is preferably set at 0.1 kPa (abs) or more and 10 kPa (abs) or less in order to sufficiently perform impregnation and in view of treatment efficiency. The time per reduced-pressure treatment (a time period for continuing a reduced state at a predetermined pressure) can be set at one minute or more and 30 minutes or less. The number of times of the reduced-pressure treatment (a set of reduced-pressure and release up to normal pressure) may be one; however, in order to more sufficiently perform impregnation, the number of times of reduced-pressure treatments may be two or more; and is preferably 5 times or less in view of treatment efficiency.

The re-impregnation of the step (D) can be performed by bringing an ultrasonic vibrator into contact with a pre-battery (outer package thereof) (ultrasonic vibration treatment).

The frequency of the ultrasonic vibrator is preferably set at 10 KHz or more and 2 MHz or less in order to sufficiently perform impregnation and in view of treatment efficiency. The ultrasonic application time (continuous application time) by the ultrasonic vibrator can be set at 10 seconds or more and 30 minutes or less. The number of times of the ultrasonic application (continuous application is regarded as one) by the ultrasonic vibrator may be one; however, in order to perform more sufficient impregnation, the number of ultrasonic application times may be two or more, and is preferably 5 or less in view of treatment efficiency.

The re-impregnation of the step (D) can be performed by external application and release of physical pressure to a pre-battery (outer package thereof) or repeating application and release of pressure (pressure application/release treatment). Pressure can be applied to the planar surface of an outer package of a pre-battery (and electrode planar surface), for example, via a flat-plate.

The pressure is preferably set at 0.5 kgf/cm² (4.9 Pa) or more and 5 kgf/cm² (49 Pa) or less in order to sufficiently perform impregnation and in view of treatment efficiency. The time for pressure application per time can be set at 0.1 second or more and 5 seconds or less. The number of times of the pressure application/release treatment (a set of application and release) may be once; however, in order to more sufficiently perform impregnation, the number of times of the pressure application/release treatment may be twice and is preferably 50 times or less in view of treatment efficiency.

The re-impregnation of the step (D) can be performed by applying physical pressure externally to a pre-battery (outer package thereof) by continuously moving a pressure application means unidirectionally along an electrode planer surface from one end to the other end thereof (continuous mobile pressure application treatment). More specifically, pressure can be applied to the outer package planer surface (and electrode planer surface) of a pre-battery by use of a roller.

The pressure is preferably set at 0.5 kgf/cm² (4.9 Pa) or more and 5 kgf/cm² (49 Pa) or less in order to sufficiently perform impregnation and in view of treatment efficiency. The moving rate of the pressure application means can be set at 5 mm/s or more and 100 mm/s or less. The number of times of the pressure application treatments (by continuous movement of a pressure application means in a single direction) may be once; however, in order to more sufficiently perform impregnation, the number of times of the pressure application treatments may be twice or more and is preferably 20 times or less in view of treatment efficiency.

In the re-impregnation of the step (D), at least two treatments selected from a reduced-pressure treatment, an ultrasonic vibration treatment, a pressure application/release treatment and a continuous mobile pressure application treatment as mentioned above may be used in combination. If at least two types of treatments are sequentially performed, the order of the treatments is not limited. An ultrasonic vibration treatment and a reduced-pressure treatment can be simultaneously performed.

The viscosity of a pre-gel solution preferably falls within the range of 15 cP (1.5 cPa·s) or more and 60 cP (6 cPa·s) or less at 20° C. in order to sufficiently and efficiently perform impregnation and obtain a desired polymer gel electrolyte. Furthermore, the viscosity of a pre-gel solution preferably falls within this range in order to sufficiently and efficiently perform re-impregnation of the step (D) after charging in the step (C).

In the step (E), in order to obtain a sufficient treatment effect, the state of charge is preferably maintained at 35° C. or more and 60° C. or less, more preferably 40° C. or more and further preferably 55° C. or less.

Examples of the aprotic solvent to be contained in a polymer gel electrolyte in the exemplary embodiment of the present invention include cyclic carbonates such as propylene carbonate (PC), ethylene carbonate (EC), butylene carbonate (BC) and vinylene carbonate (VC) and halides thereof; linear carbonates such as dimethyl carbonate (DMC), diethyl carbonate (DEC), an ethylmethyl carbonate (EMC) and dipropyl carbonate (DPC); aliphatic carboxylates such as methyl formate, methyl acetate and ethyl propanoate; γ-lactones such as γ-butyrolactone; and linear ethers such as 1,2-diethoxyethane (DEE) and ethoxymethoxy ethane (EME) and halides thereof. Examples of the aprotic solvent further include dimethylsulfoxide, 1,3-dioxolane, formamide, acetamide, dimethylformamide, dioxolane, acetonitrile, propylnitrile, nitromethane, ethyl monoglyme and phosphate such as phosphotriester, and halides thereof; trimethoxy methane, a dioxolane derivative, sulfolane, methyl sulfolane, 1,3-dimethyl-2-imidazolidinone, 3-methyl-2-oxazolidinone, a propylene carbonate derivative, a tetrahydrofuran derivative, ethyl ether, anisole, N-methylpyrrolidone and fluorinated carboxylate. These aprotonic organic solvents can be used alone or as a mixture of two types or more. However, the aprotic solvent to be used in the present invention is not limited to these.

In the exemplary embodiment of the present invention, examples of the electrolyte to be contained in a polymer gel electrolyte include, but not limited to, $LiPF_6$, $LiBF_4$, $LiAsF_6$, $LiSbF_6$, $LiClO_4$, $LiAlCl_4$, $LiN (C_nF_{2n+1}SO_2)(C_mF_{2m+1}SO_2)$ (n, m are 0, 1, 2), $LiCF_3SO_3$, bis(oxalato) borate, difluoro(oxalato) borate, tris(oxalato) phosphate, difluoro(bisoxalato) phosphate and tetrafluoro(oxalato) phosphate.

In the exemplary embodiment of the present invention, as an example of the polymer for forming a polymer gel electrolyte, a polymer having a cationic polymerizable functional group is mentioned. Examples of the cationic polymerizable functional group include groups containing a terminal double bond such as an allyl group; and cyclic ether groups such as an epoxy group, an oxetanyl group, a tetrahydrofuranyl group and a tetrahydropyranyl group. As such a polymer, a (meth)acrylate polymer having one or more cationic polymerizable functional groups per molecule in the side chain is mentioned. As the (meth)acrylate polymer serving as a main chain, a homopolymer or copolymer of an acrylate or a methacrylate and a homopolymer or copolymer of urethane acrylate or urethane methacrylate are mentioned. The polymers may be used alone or as a mixture of two types or more. Other polymerizable components may be mixed with the polymers. A crosslinked product of such a polymer may be contained in the polymer gel electrolyte. Alternatively, examples of amorphous polymers may include, but not limited to, (meth)acrylate polymers such as polymethyl methacrylate (PMMA) as an amorphous polymer. In this case, the process is not limited to the process of the present invention.

As the SEI-forming agent, a general additive, which is known to form an SEI on an electrode, can be used. An additive forming an SEI on a negative electrode, an additive forming an SEI on a positive electrode and an additive having both functions can be used. Examples of the SEI-forming agent include, but not limited to, cyclic unsaturated sultone compounds such as 1,3-propane sultone and 1,3-propene sultone; carbonates such as vinylene carbonate; disulfonates such as cyclic disulfonate and linear disulfonate; Li salts of oxalato complexes such as lithium bis(oxalato)borate and lithium tetrafluoro(oxalato)phosphate; fluorides such as fluorides of cyclic carbonates and linear carbonates, fluorides of ether compounds and fluorides of phosphates. Of them, at least one selected from a cyclic unsaturated sultone compound, a carbonate, a cyclic disulfonate and a linear disulfonate is preferable.

In the exemplary embodiment of the present invention, as a negative-electrode active material of a battery, for example, one or two or more substances selected from the group consisting of a lithium metal, a lithium alloy and a material capable of absorbing and desorbing lithium can be used. As the material absorbing and desorbing a lithium ion, a carbon material or an oxide can be used.

As the carbon material absorbing and desorbing a lithium ion, for example, any one of graphite, amorphous carbon, diamond-like carbon and a carbon nanotube, or a composite of these can be used. In particular, a graphite material is preferred not only since it has a high electronic conductivity and excellent adhesiveness to a collector formed of a metal such as copper and excellent voltage planarity but also since a graphite material, which is produced at high treatment temperature, contains a small amount of impurities, advantageously working for improving the performance of a negative electrode. Furthermore, a composite material of a high crystallinity graphite material and low crystallinity amorphous carbon, and the like can be used.

As the oxide absorbing and desorbing a lithium ion, any one of a silicon oxide, tin oxide, indium oxide, zinc oxide, lithium oxide, phosphoric acid and boric acid, or composite of these can be used. In particular, a silicon oxide is preferred. A negative-electrode active material preferably contains a silicon oxide. The silicon oxide preferably has an amorphous structure. This is because such a silicon oxide is stable and unlikely reacts with other compounds, and an amorphous structure is free of deterioration due to non-uniformity such as a crystal grain boundary and defects. As a method for forming a film from an oxide, a vapor deposition method, a CVD method, a sputtering method or the like can be employed.

As a lithium alloy, a lithium alloy constituted of lithium and a metal capable of forming an alloy with lithium can be used. Examples thereof include at least binary or ternary alloys of lithium with a meal such as Al, Si, Pb, Sn, In, Bi, Ag, Ba, Ca, Hg, Pd, Pt, Te, Zn and La. As a lithium metal and a lithium alloy, particularly amorphous ones are preferred. This is because an amorphous structure rarely has deterioration due to non-uniformity such as a crystal grain boundary and defects.

A lithium metal or a lithium alloy can be formed by a method appropriately selected from methods such as a melt cooling method, a liquid quenching method, an atomizing method, a vacuum deposition method, a sputtering method, a plasma CVD method, an optical CVD method, a thermal CVD method and a sol-gel method.

As a positive electrode active material of a battery according to the exemplary embodiment of the present invention, for example, a lithium-containing complex oxides such as $LiCoO_2$, $LiNiO_2$ and $LiMn_2O_4$ is mentioned. Furthermore, compounds obtained by replacing transition metal moieties of these lithium-containing complex oxides with other elements may be employed.

Alternatively, a lithium-containing complex oxide having a plateau at a metal lithium opposite potential of 4.5 V or more can be used. Examples of such a lithium-containing complex oxide include spinel type lithium manganese composition oxide, olivine type lithium-containing composition oxide and reverse spinel type lithium-containing composition oxide. For example, a compound represented by $Li_a(M_xMn_{2-x})O_4$ (in the formula, x satisfies 0<x<2; a satisfies 0<a<1.2; and M is at least one type selected from the group consisting of Ni, Co, Fe, Cr and Cu) can be mentioned.

A battery according to the exemplary embodiment contains, as structural elements, an electrode group containing a positive electrode, a negative electrode and a separator, an electrolyte and an outer package housing these. As the electrode group, a laminate and a rolled structure can be used. As the outer package, an aluminum laminate outer package and a metal outer package can be used. The capacity of the battery is not particularly limited and can be appropriately set.

The electrode group may contain at least a set of a positive electrode and a negative electrode and a separator interposed between these electrodes. A sheet-form positive electrode, negative electrode and separator are stacked and may be used as a laminate while maintaining a planer form. Alternatively, a longitudinal laminate is formed and rolled to form a rolled structure.

As the positive electrode and negative electrode, those each having an active material layer containing an active material, binder, and, if necessary, a conductive auxiliary, formed on a collector, can be used.

In the exemplary embodiment, crystallinity of the polymer in the obtained polymer gel electrolyte can be determined by use of e.g., a transmission electron microscope (TEM), the Raman scattering measurement, X-ray diffraction (XRD) and differential scanning calorimetry (DSC). In the exemplary embodiment, crystallinity of the obtained polymer can be determined from an image observed particularly by TEM at a magnification of 1,000,000 to 2,500,000. A polymer portion in which molecules are orderly arranged can be determined as a crystalline polymer; whereas a polymer portion in which molecules are present at random can be determined as an amorphous polymer.

EXAMPLES

Now, the present invention will be more specifically described by way of Examples; however, the present invention is not limited to these.

Example 1

Figure 1B:
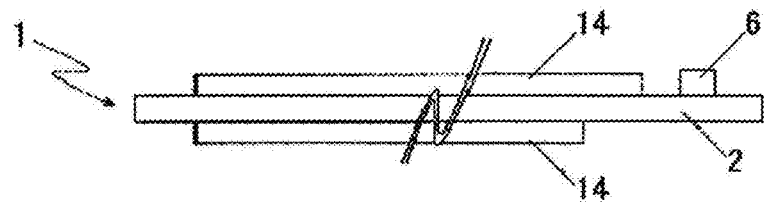
Figure 2A:
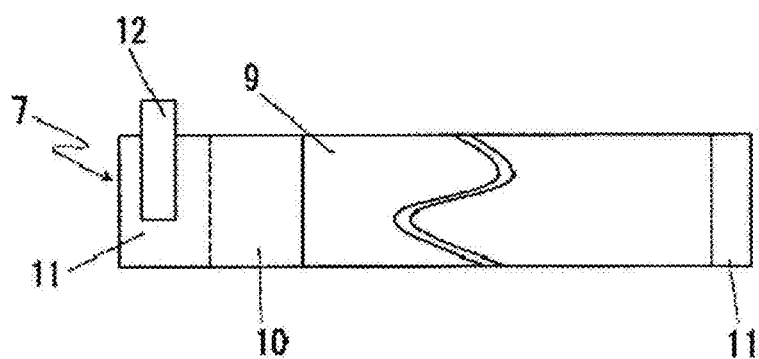
FIGS. 2A and 2B show views for illustrating the structure of the negative electrode of the lithium ion secondary battery in Example 1.
Figure 2B:
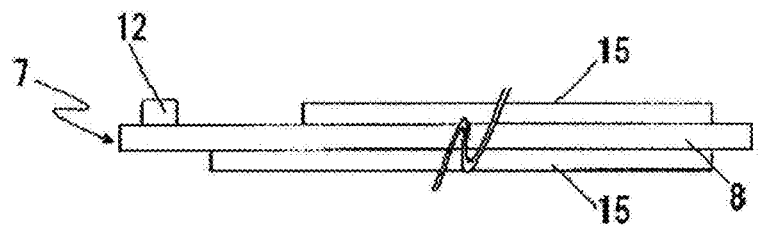
Figure 3:
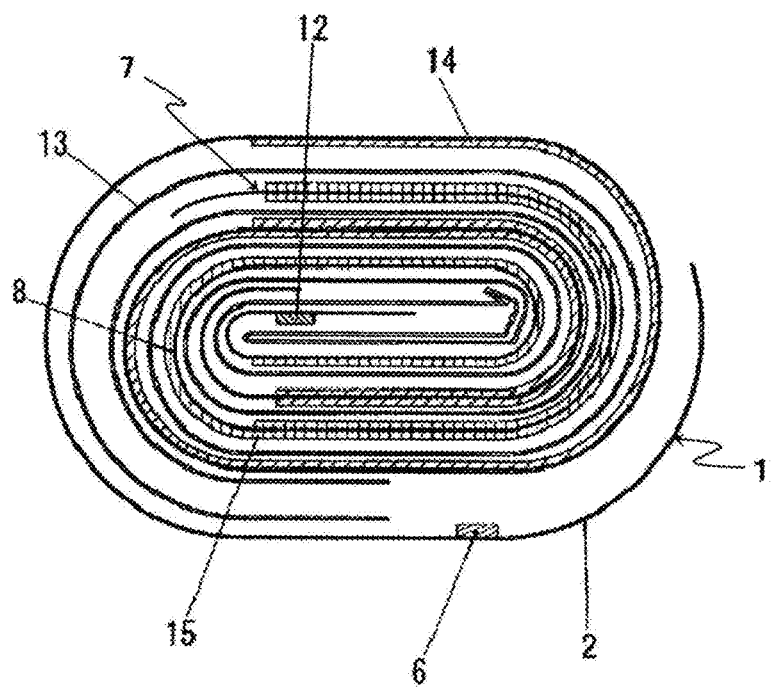
FIG. 3 shows a view illustrating the structure of the electrode group of the lithium ion secondary battery in Example 1 after rolling.

FIGS. 1A and 1B show views for illustrating the structure of the positive electrode of a lithium ion battery; FIG. 1A is a plan view of the positive electrode and FIG. 1B is a side view of the positive electrode. FIGS. 2A and 2B show views for illustrating the structure of the negative electrode of the lithium ion battery; FIG. 2A is a plan view of the negative electrode and FIG. 2B is a side view of the negative electrode. FIG. 3 is a view illustrating the structure of the electrode group of the lithium ion battery after rolling.

First, referring to FIGS. 1A and 1B, fabrication of the positive electrode will be described. To a mixture containing $LiMn_2O_4$ (91% by mass), acetylene black (5% by mass) as a conductive additive and polyvinylidene fluoride (4% by mass) as a binder, N-methylpyrrolidone was added. The mixture was further stirred to prepare a positive electrode slurry. The slurry was applied to both surfaces of an Al foil 2 of 20 μm in thickness serving as a current collector by a doctor blade method such that the thickness after a roll press treatment became 160 μm, dried at 120° C. for 5 minutes, and subjected to a press step to form a positive electrode active material coated portions 3 and 4 (positive electrode active material layer 14). At this time, to both surfaces of both end portions, a positive electrode active material non-coated portion 5 (at which the positive electrode active material was not applied) was provided. Onto one of the positive electrode active material non-coated portions 5, a positive electrode conductive tab 6 was provided. Note that, in the positive electrode active material coated portions 3 and 4, at the portion adjacent to the positive electrode active material non-coated portion 5 having a tab 6 provided thereto, only one surface was coated (positive electrode active material one-sided coated portion 4). Through the aforementioned process, a positive electrode 1 was obtained.

Next, referring to FIGS. 2A and 2B, fabrication of the negative electrode will be described. Graphite (94% by mass), acetylene black (1% by mass) serving as a conductive additive and polyvinylidene fluoride (5% by mass) serving as a binder were mixed. To the mixture, N-methylpyrrolidone was added and further stirred to prepare a negative electrode slurry. This slurry was applied to both surfaces of a Cu foil 8 serving as a current collector of 10 μm in thickness such that the thickness after a roll press treatment became 120 μm, dried at 120° C. for 5 minutes and subjected to a press step to form a negative-electrode active material coated portions 9 and 10 (negative electrode active material layer 15). At this time, onto both surfaces of both end portions, a negative electrode active material non-coated portion 11 (at which a negative electrode active material was not applied) was provided. Onto one of the negative electrode active material non-coated portions 11, a negative electrode conductive tab 12 was provided. Note that, in the negative electrode active material coated portions 9 and 10, at the portion adjacent to the negative electrode active material non-coated portion 11 having a tab 12 provided thereto, only one surface was coated (negative electrode active material one-sided coated portion 10). Through the aforementioned process, a negative electrode 7 was obtained.

Next, referring to FIG. 3, fabrication of the electrode group will be described. Two separators 13, each formed of a hydrophilically treated polypropylene microporous film having a thickness of 25 μm and a porosity of 55%, were stacked and the ends were welded. The welded portion was cut, processed, immobilized to a core of a rolling apparatus and rolled up. At this time, leading ends of the positive electrode 1 (FIGS. 1A and 1B) and negative electrode 7 (FIGS. 2A and 2B) were inserted. In the positive electrode 1, the end portion opposite to the end portion having the positive electrode conductive tab 6 provided thereon was determined as a leading end and inserted; whereas, in the negative electrode 7, the end portion having the negative electrode conductive tab 12 provided thereon was determined as a leading end and inserted. The negative electrode, which was interposed between the two separators, and the positive electrode, which was disposed on the upper outer surface of one of the separators, were rolled by rotating the core to form an electrode group (jelly roll).

Next, the electrode group obtained above was housed in an outer package formed of an embossed laminate. The positive electrode conductive tab 6 and the negative electrode conductive tab 12 were pulled out. One of the sides of the laminate outer package was folded back and sealed with heat, with leaving a portion for injecting a liquid unsealed.

Polymer A for a gel electrolyte was formed as follows. Ethyl acrylate (74 parts by mass) and (3-ethyl-3-oxetanyl) methyl methacrylate (26 parts by mass) were supplied to a reaction container. A solution mixture of ethylene carbonate (EC) and diethyl carbonate (DEC) (EC/DEC=30/70 (volume ratio)) as a reaction solvent and N,N'-azobisisobutyronitrile as a polymerization initiator (2500 ppm relative to monomer weight) were added. The mixture was heated at 65 to 70° C. while introducing dry nitrogen gas. After completion of the reaction, the mixture was cooled to room temperature. Thereafter, a solution mixture of EC and DEC (EC/DEC=30/70 (volume ratio)) was added as a dilution solvent. The mixture was stirred until the entire mixture was homogenized to obtain a polymer solution having a concentration of 4.0% by mass and a weight average molecular weight of 200,000, which was measured by GPC (gel permeation chromatography) (reference sample: standard polystyrene).

The above polymer (a concentration of 2.0% by mass), 1,3-propane sultone (compound a) as an SEI-forming agent (a concentration of 3.0% by mass) and $LiPF_6$ (a concentration of 1.0 mol/l) were blended with the aforementioned dilution solvent so as to obtain the concentrations within the parentheses to prepare a pre-gel solution. The viscosity of the pre-gel solution was 30 cP (3 cPa·s).

Next, the pre-gel solution was injected through the injection portion of the laminate outer package and impregnation under vacuum (pressure: 10 kPa (abs)) was performed in a chamber, and then the injection portion was vacuum sealed to fabricate a pre-battery.

The obtained pre-battery was charged at a constant current and a constant voltage (CC-CV charging, upper limit voltage 3.0 V, current 0.2 C, CV time: 0.5 hours).

Subsequently, a re-impregnation treatment was performed as follows. A part of heat-sealed portion of the laminate of the pre-battery was opened and the pressure within a chamber was allowed to reach 10 kPa (abs), maintained for one minute and released to the atmospheric pressure. This operation was repeated three times (re-impregnation under reduced pressure) and thereafter, the opened portion was vacuum sealed again (re-sealing).

Subsequently, the pre-battery was subjected to CC-CV charging (upper limit voltage: 4.2 V, current: 0.2 C, CV time: 1.5 hours).

Subsequently, a crosslinking reaction of the polymer was performed in the pre-gel solution by allowing the pre-battery to stand still (aging) in a constant-temperature vessel of 45° C. for 7 days to form a polymer gel electrolyte. In this manner, a desired polymer battery was obtained.

As the rate characteristics of the obtained battery, the ratio of 3 C capacity to 0.2 C capacity at 20° C. was shown in Table 1.

A cycle test of the obtained battery was performed as follows. A cycle of CC-CV charging (upper limit voltage: 4.2 V, current: 1 C, CV time: 1.5 hours) and CC discharging (lower limit voltage: 3.0 V, current: 1 C) were repeated 1000 times at 45° C. As the capacity retention rate after 1000 cycles, the ratio of discharge capacity at 1000th cycle relative to discharge capacity at 1st cycle was shown in Table 1.

With respect to the batteries obtained in this Example, the following Examples and Comparative Examples, the polymer layer formed on an electrode active material was observed by a TEM (transmission electron microscope) as follows. A battery, which was obtained by charging a pre-battery and then allowing it to stand still in a constant-temperature vessel of 45° C. for 7 days to perform a crosslinking reaction of a polymer, was discharged up to 1 V or less and thereafter, broken down in Ar gas. An electrode was cut into pieces of a predetermined size. The electrode pieces were soaked in diethylcarbonate (DEC) for one minute to wash away the supporting electrolyte and solvent components and then dried one hour or more. The electrode pieces were reduced in thickness by an FIB (focused ion beam) method. The obtained thin-piece samples were subjected to the TEM observation.

Furthermore, the surface of the electrode was observed by a SIM (scanning ion microscope) as follows. The electrode pieces obtained in the same manner as in the above were soaked in diethylcarbonate (DEC) for one minute to wash away a supporting electrolyte and solvent components and then dried for one hour or more. The obtained electrode pieces were subjected to SIM observation.

Example 2

A battery was fabricated in the same manner as in Example 1 except that, as the re-impregnation treatment, a treatment (re-impregnation under reduced pressure), in which the pressure within a chamber was allowed to reach 0.5 kPa (abs), maintained for one minute and released to the atmospheric pressure, was repeated three times. The rate characteristics and cycle characteristics of the obtained battery were evaluated in the same manner as in Example 1. The results were shown in Table 1.

Example 3

A battery was fabricated in the same manner as in Example 1 except that, as a re-impregnation treatment, a treatment (re-impregnation under reduced pressure) in which the pressure within a chamber was allowed to reach 0.5 kPa (abs), maintained for one minute and released to the atmospheric pressure, was performed once. The rate characteristics and cycle characteristics of the obtained battery were evaluated in the same manner as in Example 1. The results were shown in Table 1.

Example 4

A battery was fabricated in the same manner as in Example 1 except that, as the re-impregnation treatment, a treatment (re-impregnation under reduced pressure), in which the pressure within a chamber was allowed to reach 0.2 kPa (abs), maintained for one minute and released to the atmospheric pressure, was repeated three times. The rate characteristics and cycle characteristics of the obtained battery were evaluated in the same manner as in Example 1. The results were shown in Table 1.

Example 5

A battery was fabricated in the same manner as in Example 1 except that, as a re-impregnation treatment, a treatment (ultrasonic re-impregnation), in which ultrasonic vibration having a frequency of 10 KHz was applied to a pre-battery for 30 seconds. The rate characteristics and cycle characteristics of the obtained battery were evaluated in the same manner as in Example 1. The results were shown in Table 1.

Example 6

A battery was fabricated in the same manner as in Example 1 except that, as a re-impregnation treatment, a treatment (ultrasonic re-impregnation), in which ultrasonic vibration having a frequency of 10 KHz was applied to a pre-battery for 3 minutes. The rate characteristics and cycle characteristics of the obtained battery were evaluated in the same manner as in Example 1. The results were shown in Table 1.

Example 7

A battery was fabricated in the same manner as in Example 1 except that, as a re-impregnation treatment, a treatment (ultrasonic re-impregnation), in which ultrasonic vibration having a frequency of 100 KHz was applied to a pre-battery for 3 minutes. The rate characteristics and cycle characteristics of the obtained battery were evaluated in the same manner as in Example 1. The results were shown in Table 1.

Example 8

A battery was fabricated in the same manner as in Example 1 except that, as a re-impregnation treatment, a treatment (ultrasonic re-impregnation), in which ultrasonic vibration having a frequency of 100 KHz was applied to a pre-battery for three minutes without opening a heat-sealed portion of the pre-battery. The rate characteristics and cycle characteristics of the obtained battery were evaluated in the same manner as in Example 1. The results were shown in Table 1.

Example 9

A battery was fabricated in the same manner as in Example 1 except that, as a re-impregnation treatment, a treatment (ultrasonic re-impregnation under reduced pressure), in which the pressure was reduced while applying an ultrasonic vibration having a frequency of 100 KHz to a pre-battery, up to 0.2 kPa (abs), maintained for one minute and released to the atmospheric pressure, was repeated three times. The rate characteristics and cycle characteristics of the obtained battery were evaluated in the same manner as in Example 1. The results were shown in Table 1.

Example 10

A battery was fabricated in the same manner as in Example 1 except that, as a re-impregnation treatment, a treatment (impregnation under pressurization), in which a plate was attached to a planar surface of a pre-battery and a pressure of 0.5 kgf/cm$^2$ (49 kPa) was applied for one second without opening the heat-sealed portion of the pre-battery, was repeated 30 times. The rate characteristics and cycle characteristics of the obtained battery were evaluated in the same manner as in Example 1. The results were shown in Table 1.

Example 11

A battery was fabricated in the same manner as in Example 1 except that, as a re-impregnation treatment, a treatment (impregnation under pressurization), in which a plate was attached to a planar surface of a pre-battery and a pressure of 2 kgf/cm$^2$ (196 kPa) was applied for one second without opening the heat-sealed portion of the pre-battery, was repeated 30 times. The rate characteristics and cycle characteristics of the obtained battery were evaluated in the same manner as in Example 1. The results were shown in Table 1.

Example 12

A battery was fabricated in the same manner as in Example 1 except that, as a re-impregnation treatment, a treatment (impregnation under pressurization), in which a plate was attached to a planar surface of a pre-battery and a pressure of 2 kgf/cm$^2$ (196 kPa) was applied for one second while opening the heat-sealed portion of the pre-battery, was repeated 30 times. The rate characteristics and cycle characteristics of the obtained battery were evaluated in the same manner as in Example 1. The results were shown in Table 1.

Example 13

A battery was fabricated in the same manner as in Example 1 except that, as a re-impregnation treatment, a treatment (impregnation under pressurization), in which a plate was attached to a planar surface of a pre-battery and a pressure of 2 kgf/cm$^2$ (196 kPa) was applied for one second while opening the heat-sealed portion of the pre-battery, was repeated 30 times and thereafter the treatment of re-impregnation under reduced pressure was performed in the same manner as in Example 4. The rate characteristics and cycle characteristics of the obtained battery were evaluated in the same manner as in Example 1. The results were shown in Table 1.

Example 14

A battery was fabricated in the same manner as in Example 1 except that, as a re-impregnation treatment, a treatment, in which a roller was moved over the planar surface of a pre-battery at a speed of 10 mm/s while applying a pressure of 0.5 kgf/cm$^2$ (49 kPa) by the roller without opening the heat-sealed portion of the pre-battery, was repeated 10 times. The rate characteristics and cycle characteristics of the obtained battery were evaluated in the same manner as in Example 1. The results were shown in Table 1.

Example 15

A battery was fabricated in the same manner as in Example 1 except that, as a re-impregnation treatment, a treatment, in which a roller was moved over the planar surface of a pre-battery at a speed of 10 mm/s while applying a pressure of 2 kgf/cm$^2$ (196 kPa) by the roller without opening the heat-sealed portion of the pre-battery, was repeated 10 times. The rate characteristics and cycle characteristics of the obtained battery were evaluated in the same manner as in Example 1. The results were shown in Table 1.

Example 16

A battery was fabricated in the same manner as in Example 1 except that, as a re-impregnation treatment, a treatment, in which a roller was moved over the planar surface of a pre-battery at a speed of 50 mm/s while applying a pressure of 2 kgf/cm² (196 kPa) by the roller without opening the heat-sealed portion of the pre-battery, was repeated 10 times. The rate characteristics and cycle characteristics of the obtained battery were evaluated in the same manner as in Example 1. The results were shown in Table 1.

Example 17

A battery was fabricated in the same manner as in Example 1 except that, as a re-impregnation treatment, a treatment, in which a roller was moved over the planar surface of a pre-battery at a speed of 10 mm/s while applying a pressure of 2 kgf/cm² (196 kPa) by the roller while opening the heat-sealed portion of the pre-battery, was repeated 10 times. Thereafter, the treatment of re-impregnation under reduced pressure was performed in the same manner as in Example 4. The rate characteristics and cycle characteristics of the obtained battery were evaluated in the same manner as in Example 1. The results were shown in Table 1.

Example 18

A battery was fabricated in the same manner as in Example 9 except that the stand-still (aging) period in a constant-temperature vessel was set at 14 days. The rate characteristics and cycle characteristics of the obtained battery were evaluated in the same manner as in Example 1. The results were shown in Table 1.

Example 19

A battery was fabricated in the same manner as in Example 9 except that the stand-still (aging) period in a constant-temperature vessel was set at 21 days. The rate characteristics and cycle characteristics of the obtained battery were evaluated in the same manner as in Example 1. The results were shown in Table 1.

Example 20

A battery was fabricated in the same manner as in Example 9 except that the temperature of the constant-temperature vessel was set at 55° C. The rate characteristics and cycle characteristics of the obtained battery were evaluated in the same manner as in Example 1.

Example 21

A battery was fabricated in the same manner as in Example 9 except that SOC during the stand-still (aging) period in a constant-temperature vessel was set at 80%. The rate characteristics and cycle characteristics of the obtained battery were evaluated in the same manner as in Example 1. The results were shown in Table 1.

Example 22

A battery was fabricated in the same manner as in Example 9 except that ethylene methane disulfonate (1,5,2,4-dioxandithiepane-2,2,4,4-tetraoxide) (compound b) was added in an amount of 2.0% by mass as an SEI-forming agent of a pre-gel solution, in place of 1,3-propane sultone. The rate characteristics and cycle characteristics of the obtained battery were evaluated in the same manner as in Example 1. The results were shown in Table 1.

Example 23

A battery was fabricated in the same manner as in Example 9 except that ethylene methane disulfonate (1,5,2,4-dioxandithiepane-2,2,4,4-tetraoxide) (compound b) was added in an amount of 1.5% by mass and 1,3-propane sultone (compound a) in an amount of 1.0% by mass as an SEI-forming agent of a pre-gel solution. The rate characteristics and cycle characteristics of the obtained battery were evaluated in the same manner as in Example 1. The results were shown in Table 1.

Example 24

A battery was fabricated in the same manner as in Example 9 except that bis(oxalato)lithium borate (compound c) was added in an amount of 1.0% by mass and vinylene carbonate (compound d) was added in an amount of 0.5% by mass, as an SEI-forming agent of a pre-gel solution, in place of 1,3-propane sultone (compound a). The rate characteristics and cycle characteristics of the obtained battery were evaluated in the same manner as in Example 1. The results were shown in Table 1.

Example 25

A battery was fabricated in the same manner as in Example 9 except that 1,3-propane sultone (compound a) was not added as an SEI-forming agent of a pre-gel solution. The rate characteristics and cycle characteristics of the obtained battery were evaluated in the same manner as in Example 1. The results were shown in Table 2.

Example 26

A battery was fabricated in the same manner as in Example 1 except that no re-impregnation treatment was performed. The rate characteristics and cycle characteristics of the obtained battery were evaluated in the same manner as in Example 1. The results were shown in Table 2.

Example 27

A battery was fabricated in the same manner as in Example 22 except that no re-impregnation treatment was performed. The rate characteristics and cycle characteristics of the obtained battery were evaluated in the same manner as in Example 1. The results were shown in Table 2.

Example 28

A battery was fabricated in the same manner as in Example 24 except that no re-impregnation treatment was performed. The rate characteristics and cycle characteristics of the obtained battery were evaluated in the same manner as in Example 1. The results were shown in Table 2.

Example 29

In this Example, an amorphous polymer layer was previously formed on the surfaces of electrodes by using polymethyl methacrylate (PMMA) (polymer B) as the polymer to be formed on the electrodes. More specifically, a solution was prepared by dissolving PMMA in DMF (dimethylformamide) in a PMMA concentration of 10% by mass. The solution was uniformly applied to a positive electrode and a negative electrode and dried before an electrode group was prepared. A battery was fabricated in the same manner as in Example 9 except that the positive electrode and negative electrode formed as mentioned above were used. The rate characteristics and cycle characteristics of the obtained battery were evaluated in the same manner as in Example 1. The results were shown in Table 2.

Comparative Example 1

A pre-battery was obtained in the same manner as in Example 1. Before charging was performed at a constant current and a constant voltage, the polymer was crosslinked by allowing the battery to stand still within a constant-temperature vessel of 60° C. for 24 hours. Thereafter, the battery was subjected to charging at constant current and a constant voltage (CC-CV charging, upper limit voltage: 3.0 V, current: 0.2 C, CV time: 0.5 hours). Thereafter, the same procedure as in Example 9 was conducted to fabricate a battery (standstill in a 45° C.-constant-temperature vessel for 7 days was also performed). The rate characteristics and cycle characteristics of the obtained battery were evaluated in the same manner as in Example 1. The results were shown in Table 2.

Comparative Example 2

A battery was fabricated in the same manner as in Comparative Example 1 except that no re-impregnation treatment was performed. The rate characteristics and cycle characteristics of the obtained battery were evaluated in the same manner as in Example 1. The results were shown in Table 2.

Comparative Example 3

In this Comparative Example, polyvinylidene fluoride (PVDF) (polymer C) was used as a crystalline polymer to be formed on electrodes. More specifically, a solution was prepared by dissolving PVDF in DMF (dimethylformamide) in a PVDF concentration of 10% by mass. The solution was uniformly applied to a positive electrode and a negative electrode and dried before an electrode group was prepared. A battery was fabricated in the same manner as in Example 9 except that the positive electrode and negative electrode formed as mentioned above were used. The rate characteristics and cycle characteristics of the obtained battery were evaluated in the same manner as in Example 1. The results were shown in Table 2.

TABLE 1

| | Re-impregnation | | | Aging | | | Initial rate characteristics (%) | Capacity retention rate after 1000 cycles |
| --- | --- | --- | --- | --- | --- | --- | --- | --- |
| | Method | Condition | Re-sealing | SOC | Temperature | Period | 3 C/0.2 C | (%) |
| Example 1 | Pressure reduction | 10 kPa, 1 minute, three times | Open-re-sealing under reduced pressure | 100% | 45° C. | 7 days | 82 | 68 |
| Example 2 | Pressure reduction | 0.5 kPa, 1 minute, three times | Open-re-sealing under reduced pressure | 100% | 45° C. | 7 days | 82 | 69 |
| Example 3 | Pressure reduction | 0.5 kPa, 1 minute, once | Open-re-sealing under reduced pressure | 100% | 45° C. | 7 days | 79 | 68 |
| Example 4 | Pressure reduction | 0.2 kPa, 1 minute, three times | Open-re-sealing under reduced pressure | 100% | 45° C. | 7 days | 90 | 72 |
| Example 5 | Ultrasonic wave | 10 kHz, 30 seconds | Open-re-sealing under reduced pressure | 100% | 45° C. | 7 days | 89 | 67 |
| Example 6 | Ultrasonic wave | 10 kHz, 3 minutes | Open-re-sealing under reduced pressure | 100% | 45° C. | 7 days | 89 | 68 |
| Example 7 | Ultrasonic wave | 100 kHz, 3 minutes | Open-re-sealing under reduced pressure | 100% | 45° C. | 7 day | 90 | 69 |
| Example 8 | Ultrasonic wave | 100 kHz, 3 minutes | Not opened | 100% | 45° C. | 7 days | 85 | 66 |
| Example 9 | Ultrasonic wave + pressure reduction | 0.2 kPa, 1 minute + 100 kHz, three times | Open-re-sealing under reduced pressure | 100% | 45° C. | 7 days | 94 | 72 |
| Example 10 | Pressurization | 0.5 kgf/cm², 1 second, thirty times | Not opened | 100% | 45° C. | 7 days | 77 | 65 |
| Example 11 | Pressurization | 2 kgf/cm², 1 second, thirty times | Not opened | 100% | 45° C. | 7 days | 77 | 65 |
| Example 12 | Pressurization | 2 kgf/cm², 1 second, thirty times | Open-re-sealing under reduced pressure | 100% | 45° C. | 7 days | 80 | 67 |
| Example 13 | Pressurization + pressure reduction | 2 kgf/cm², 1 second, thirty times + 0.2 kPa, 1 minute, three times | Open-re-sealing under reduced pressure | 100% | 45° C. | 7 days | 92 | 69 |
| Example 14 | Continuous pressurization | 0.5 kgf/cm², 10 mm/s, ten times | Not opened | 100% | 45° C. | 7 days | 75 | 65 |

TABLE 1-continued

| | Re-impregnation | | | Aging | | | Initial rate characteristics (%) | Capacity retention rate after 1000 cycles |
| | Method | Condition | Re-sealing | SOC | Temperature | Period | 3 C/0.2 C | (%) |
|---|---|---|---|---|---|---|---|---|
| Example 15 | Continuous pressurization | 2 kgf/cm², 10 mm/s, ten times | Not opened | 100% | 45° C. | 7 days | 77 | 66 |
| Example 16 | Continuous pressurization | 2 kgf/cm², 50 mm/s, ten times | Not opened | 100% | 45° C. | 7 days | 80 | 66 |
| Example 17 | Continuous pressurization + Pressure reduction | 2 kgf/cm², 10 mm/s, ten times + 0.2 kPa, 1 minute, three times | Open-re-sealing under reduced pressure | 100% | 45° C. | 7 days | 82 | 67 |
| Example 18 | Ultrasonic wave + pressure reduction | 0.2 kPa, 1 minute + 100 kHz, three times | Open-re-sealing under reduced pressure | 100% | 45° C. | 14 days | 92 | 73 |
| Example 19 | Ultrasonic wave + pressure reduction | 0.2 kPa, 1 minute + 100 kHz, three times | Open-re-sealing under reduced pressure | 100% | 45° C. | 21 days | 93 | 75 |
| Example 20 | Ultrasonic wave + pressure reduction | 0.2 kPa, 1 minute + 100 kHz, three times | Open-re-sealing under reduced pressure | 100% | 55° C. | 7 days | 90 | 75 |
| Example 21 | Ultrasonic wave + pressure reduction | 0.2 kPa, 1 minute + 100 kHz, three times | Open-re-sealing under reduced pressure | 80% | 45° C. | 7 days | 92 | 69 |
| Example 22 | Ultrasonic wave + pressure reduction | 0.2 kPa, 1 minute + 100 kHz, three times | Open-re-sealing under reduced pressure | 100% | 45° C. | 7 days | 89 | 82 |
| Example 23 | Ultrasonic wave + pressure reduction | 0.2 kPa, 1 minute + 100 kHz, three times | Open-re-sealing under reduced pressure | 100% | 45° C. | 7 days | 82 | 85 |
| Example 24 | Ultrasonic wave + pressure reduction | 0.2 kPa, 1 minute + 100 kHz, three times | Open-re-sealing under reduced pressure | 100% | 45° C. | 7 days | 92 | 76 |

TABLE 2

| | Polymer | Additive | Re-impregnation | Aging | | | Initial rate characteristics (%) | Capacity retention rate after 1000 cycles |
| | | | | SOC | Temperature | Period | 3 C/0.2 C | (%) |
|---|---|---|---|---|---|---|---|---|
| Example 4 | A | a | Performed | 100% | 45° C. | 7 days | 90 | 72 |
| Example 22 | A | b | Performed | | | | 89 | 82 |
| Example 23 | A | a + b | Performed | | | | 85 | 85 |
| Example 24 | A | c + d | Performed | | | | 92 | 76 |
| Example 25 | A | Absent | Performed | | | | 71 | 62 |
| Example 26 | A | a | Not performed | | | | 90 | 73 |
| Example 27 | A | b | Not performed | | | | 88 | 71 |
| Example 28 | A | c + d | Not performed | | | | 79 | 68 |
| Example 29 | B | a | Performed | | | | 78 | 68 |
| Comparative Example 1 | A (Previously polymerized) | a | Performed | | | | 63 | 69 |
| Comparative Example 2 | A (Previously polymerized) | a | Not performed | | | | 62 | 63 |
| Comparative Example 3 | C | a | Not performed | | | | 55 | 62 |

Figure 4:
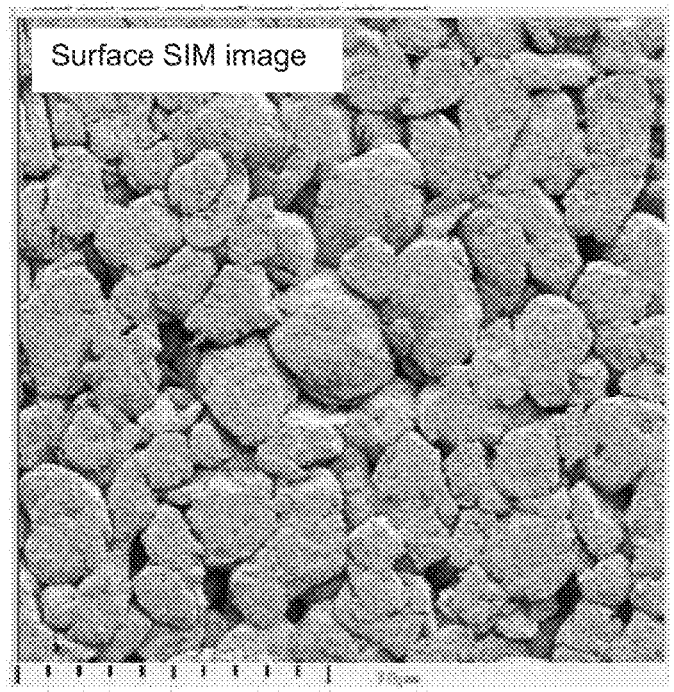
FIG. 4 is an image (SIM image) of the electrode surface in Example 4 after a polymer gel electrolyte is formed.
Figure 5:
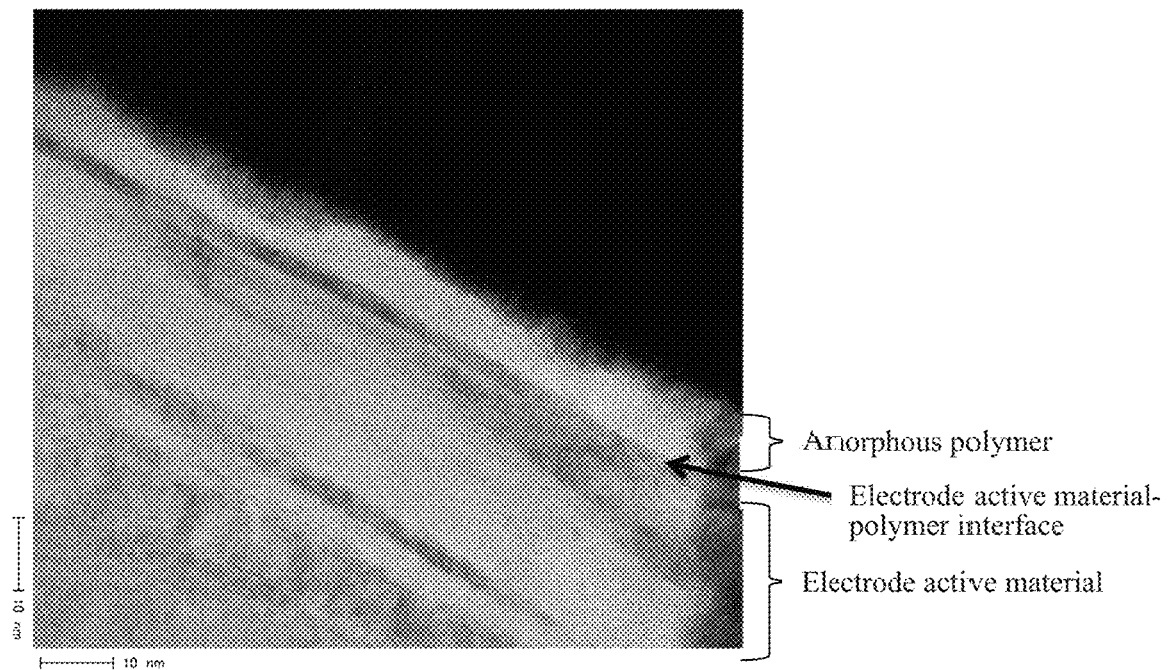
FIG. 5 is a TEM image showing a polymer formed on the electrode active material in Example 4.
Figure 6:
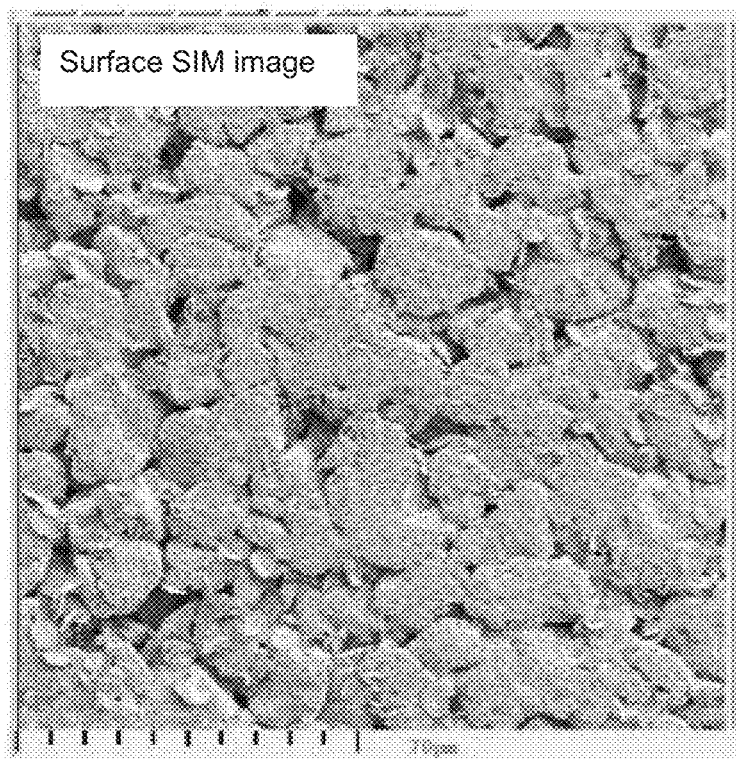
FIG. 6 is an image (SIM image) of an electrode surface in Comparative Example 1 after a polymer gel electrolyte is formed.
Figure 7:
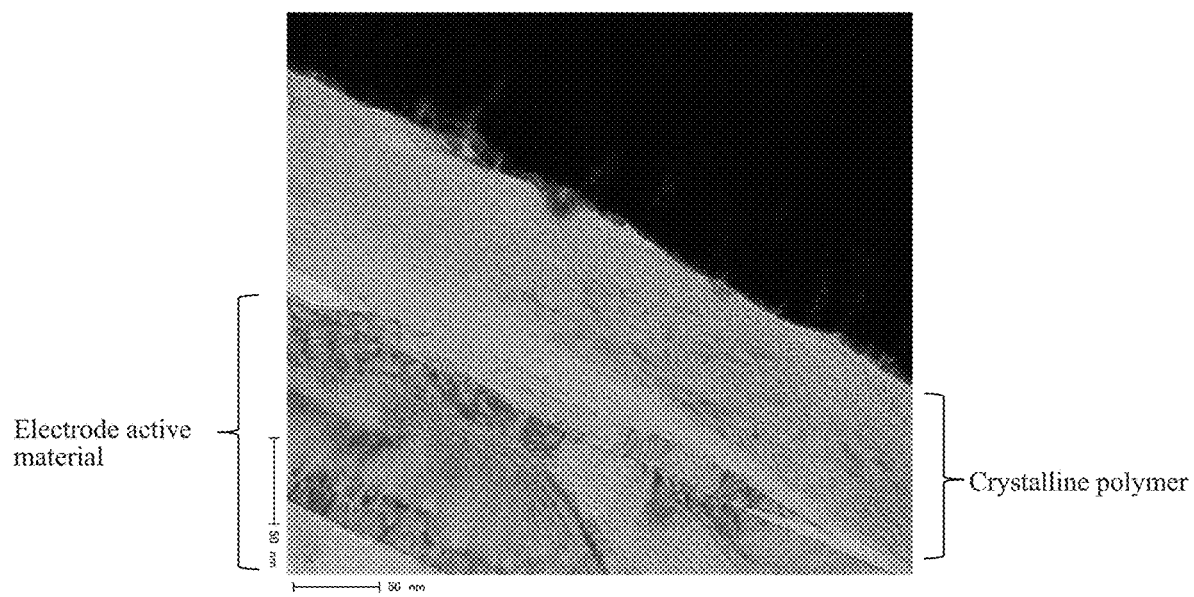
FIG. 7 is a TEM image showing a polymer formed on the electrode active material in Comparative Example 1.
Figure 8:
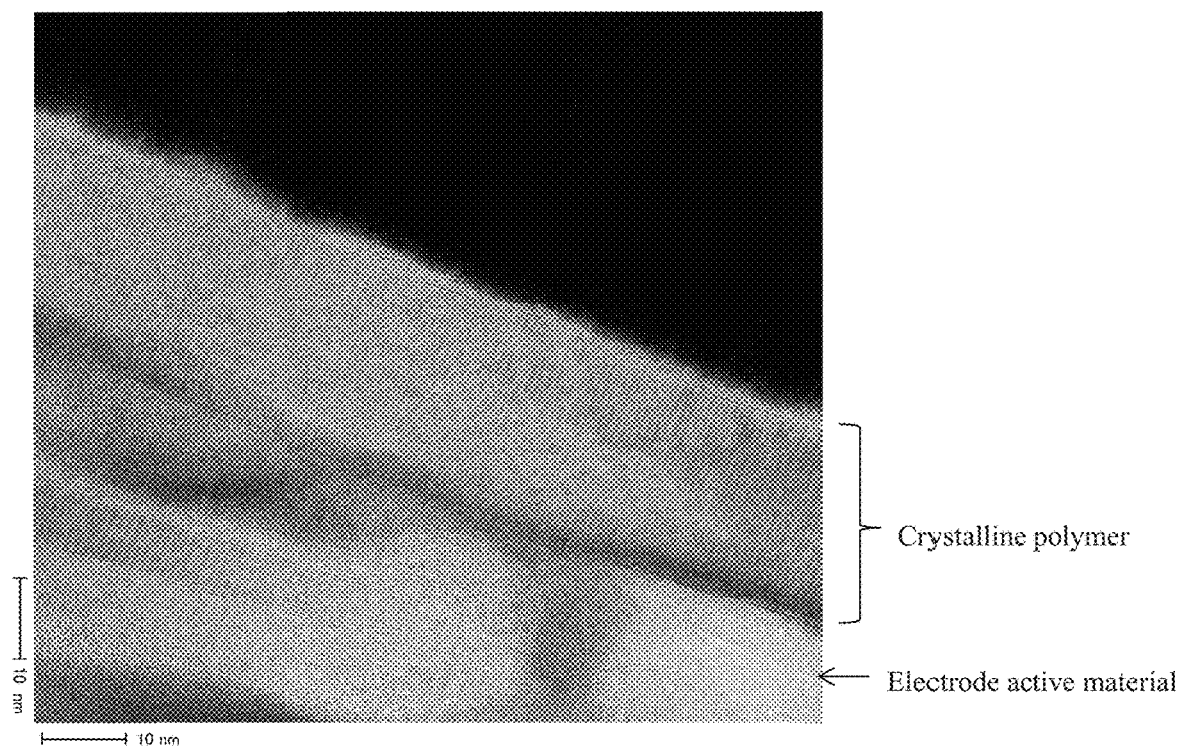
FIG. 8 is a TEM image showing a polymer formed on the electrode active material (spaces between electrode active material particles) in Comparative Example 1.

As is shown in FIGS. 4 and 5 regarding Example 4 and FIGS. 6, 7 and 8 regarding Comparative Example 1, a thin (about 5 nm) amorphous polymer layer is formed on an electrode active material in the Examples. Since the layer does not inhibit conduction of lithium ions, it is understood that rate characteristics are satisfactory. In contrast, in Comparative Example 1, a thick (several tens of nanometers) polymer layer including a crystalline polymer is formed on an electrode active material. In addition, a large amount of crystalline polymer is present in spaces between the active material particles on an electrode surface side. For this reason, it was understood that rate characteristics are unsatisfactory and sufficient cycle characteristics cannot be obtained.

FIG. 4 (SIM image of Example 4) shows that an amorphous polymer is uniformly formed on an electrode active material (the contours of electrode active material particles are relatively clearly seen). In contrast, FIG. 6 (SIM image of Comparative Example 1) shows that a large amount of crystalline polymer is present on an electrode active material and a scale-like crystalline polymer is present in the spaces between particles.

Furthermore, FIG. 5 (TEM image of Example 4) shows that a thin amorphous polymer layer (about 5 nm) is formed on an electrode active material. In contrast, FIG. 7 (TEM image of Comparative Example 1) shows that a thick (several tens of nanometers) crystalline polymer layer is formed on an electrode active material. Furthermore, FIG. 8 (TEM image of Comparative Example 1) shows that a crystalline polymer is present also on the electrode active material in spaces between active material particles on an electrode surface side.

It was found that a thick (about 40 nm to 80 nm) polymer layer formed of a crystalline polymer or a mixture of crystalline/amorphous polymers is present on the surface of an electrode active material in Comparative Examples 1 to 3; whereas, in all of Examples, a thin amorphous polymer layer is formed on an electrode active material surface, as shown in FIG. 5.

When Examples 4 and 29 and Comparative Example 3 are compared, it was found that even if the type of polymer is changed, the presence of an amorphous polymer layer on the surface of an electrode active material has a significant effect upon rate characteristics, compared to the presence of the crystalline polymer layer.

As is shown in Example 25, it was found that satisfactory rate characteristics can be obtained even if an SEI-forming agent is not added, since a solvent component of an electrolyte, i.e., a carbonate, forms an SEI.

As is apparent from Examples 1 to 24, it was found that in order to form further strong SEI, re-impregnation under reduced pressure, ultrasonic re-impregnation, pressurized re-impregnation using a flat-plate or a roller, or a combination of these can be employed, with the result that satisfactory rate characteristics and cycle characteristics can be obtained. Furthermore, it was found that rate characteristics and cycle characteristics were further improved by opening and resealing the heat sealing portion of a pre-battery in a re-impregnation treatment.

As described above, a pre-battery was charged so as not to gelatinize a pre-gel solution to form an SEI on an electrode surface, and thereafter, charged to form a polymer gel electrolyte. In this way, satisfactory rate characteristics and cycle characteristics can be obtained.

Furthermore, a pre-battery was charged so as not to gelatinize a pre-gel solution to form an SEI on an electrode surface and thereafter, a re-impregnation treatment was performed. In this way, the pre-gel solution (when an SEI-forming agent is used, the remaining SEI-forming agent is also homogenized) can be homogenized. Thereafter, the pre-battery was charged and an aging treatment was performed by warming while maintaining a charge state to form a polymer gel electrolyte; at the same time, impregnation of micro pore with the pre-gel solution can be sufficiently made to form a uniform SEI stable for a long time. In this manner, the rate characteristics and cycle characteristics of the battery can be improved.

Having thus described the present invention with reference to the exemplary embodiments and Examples of the invention, the present invention is not limited to the above-described exemplary embodiments and Examples. Various modifications understandable to those skilled in the art may be made to the constitution and details of the present invention within the scope thereof.

This application claims the right of priority based on Japanese Patent Application No. 2012-198566, filed on Sep. 10, 2012, the entire content of which are incorporated herein by reference.

INDUSTRIAL APPLICABILITY

The present invention can be applied not only to secondary batteries but also production of energy storage devices such as electric double layer capacitors and lithium ion capacitors.

REFERENCE SIGNS LIST

1: Positive electrode
2: Al foil
3, 4: Positive electrode active material coated portion
5: Positive electrode active material non-coated portion
6: Positive electrode conductive tab
7: Negative electrode
8: Cu foil
9, 10: Negative-electrode active material coated portion
11: Negative-electrode active material non-coated portion
12: Negative electrode conductive tab
13: Separator
14: Positive electrode active material layer
15: Negative-electrode active material layer

The invention claimed is:

1. A lithium ion battery comprising a positive electrode, a negative electrode, a separator, and a polymer gel electrolyte comprising at least a lithium salt and an aprotic solvent, wherein an amorphous polymer layer is formed on a surface of an electrode active material of at least one of the positive electrode and the negative electrode.

2. The lithium ion battery according to claim 1, wherein a thickness of the amorphous polymer layer is in a range of 3 to 30 nm.

3. The lithium ion battery according to claim 1, wherein the amorphous polymer layer is formed derived from the polymer gel electrolyte.

4. The lithium ion battery according to claim 1, wherein the polymer gel electrolyte is formed from a polymer having a cationic polymerizable functional group.

5. The lithium ion battery according to claim 1, further comprising a film component derived from an electrode surface coating film-forming agent or a film component derived from an electrolyte solvent between the electrode active material surface and the amorphous polymer layer.

6. The lithium ion battery according to claim 5, wherein the electrode coating film forming agent is at least one selected from a cyclic unsaturated sultone compound, a carbonate, a cyclic disulfonate and a linear disulfonate.

7. The lithium ion battery according to claim 1, wherein the amorphous polymer layer is derived from a pre-crosslinked polymer for forming the polymer gel electrolyte.

8. The lithium ion battery according to claim 1, wherein the polymer gel electrolyte comprises a crosslinked polymer formed of a polymer having a polymerizable functional group,
    the amorphous polymer layer is derived from a pre-crosslinked polymer for forming the polymer gel electrolyte, and the pre-crosslinked polymer is the same polymer as the polymer having a polymerizable functional group.

9. The lithium ion battery according to claim 7, wherein the pre-crosslinked polymer is a (meth)acrylate polymer.

10. The lithium ion battery according to claim 8, wherein the pre-crosslinked polymer is a (meth)acrylate polymer.

* * * * *